United States Patent
Basconi

(10) Patent No.: US 6,910,894 B2
(45) Date of Patent: Jun. 28, 2005

(54) HANDS ON INSTRUCTION MANUAL

(76) Inventor: Edward A. Basconi, 112 Heather La., Johnson City, TN (US) 37601

( * ) Notice: Subject to any disclaimer, the term of this patent is extended or adjusted under 35 U.S.C. 154(b) by 27 days.

(21) Appl. No.: 10/155,259

(22) Filed: May 24, 2002

(65) Prior Publication Data

US 2003/0219703 A1 Nov. 27, 2003

(51) Int. Cl.[7] ............................................. G09B 19/00
(52) U.S. Cl. ...................... 434/224; 434/317; 434/301; 281/31; 361/761; 174/260; 174/52.1
(58) Field of Search ................................ 434/224, 317, 434/301; 446/268; 281/31; 361/761–764; 174/260, 52.1

(56) References Cited

U.S. PATENT DOCUMENTS

| | | | | |
|---|---|---|---|---|
| 3,739,447 A | * | 6/1973 | Halliday ...................... 29/721 |
| 4,021,933 A | * | 5/1977 | Hughes ........................ 434/282 |
| 4,091,550 A | * | 5/1978 | Schrenk et al. .......... 434/366 X |
| 4,198,768 A | * | 4/1980 | Wahl et al. .................. 434/224 |
| 4,213,253 A | * | 7/1980 | Gudelis et al. ............. 434/224 |
| 4,315,320 A | * | 2/1982 | Gabriel ........................ 708/802 |
| 4,604,064 A | * | 8/1986 | Boehm et al. ........... 434/224 X |
| 4,623,312 A | * | 11/1986 | Crawford ..................... 434/224 |
| 4,812,125 A | * | 3/1989 | Strashun .................. 434/224 X |
| 4,997,374 A | * | 3/1991 | Simone .................... 434/317 X |
| 5,209,665 A | * | 5/1993 | Billings et al. ......... 434/169 X |
| 5,611,691 A | * | 3/1997 | Poulain ................... 434/224 X |
| 5,810,604 A | * | 9/1998 | Kopp, Jr. et al. ........ 434/317 X |
| 6,079,748 A | * | 6/2000 | Kaufman ................... 281/22 X |
| 6,164,534 A | * | 12/2000 | Rathus et al. ........... 235/380 X |
| 6,201,947 B1 | * | 3/2001 | Hur et al. ................ 434/317 X |
| 6,371,765 B1 | * | 4/2002 | Wall et al. .............. 434/224 X |
| 6,572,376 B1 | * | 6/2003 | Saunders .................. 434/30 X |
| 2003/0139113 A1 | * | 7/2003 | Wood et al. ................. 446/175 |

FOREIGN PATENT DOCUMENTS

| | | | | |
|---|---|---|---|---|
| EP | 196636 A2 | * | 10/1986 | ........... G09B/23/18 |
| EP | 526090 A2 | * | 2/1993 | ........... G09B/23/18 |
| GB | 2256962 A | * | 12/1992 | ........... G09B/23/18 |

* cited by examiner

Primary Examiner—Chanda L. Harris

(57) ABSTRACT

A manual for teaching and/or demonstrating the assembly and/or operation of a transmittable energy circuit, wherein the manual has a base hinged to a plurality of pages for folding the pages over or away from the base, wherein at least one of the pages has conductor portions of an energy circuit thereon, and wherein the portions are provided with electrical connectors for receiving one or more electrical components adapted for completing the circuit, and wherein at least one of the pages has instructions thereon for so completing said circuit.

8 Claims, 3 Drawing Sheets

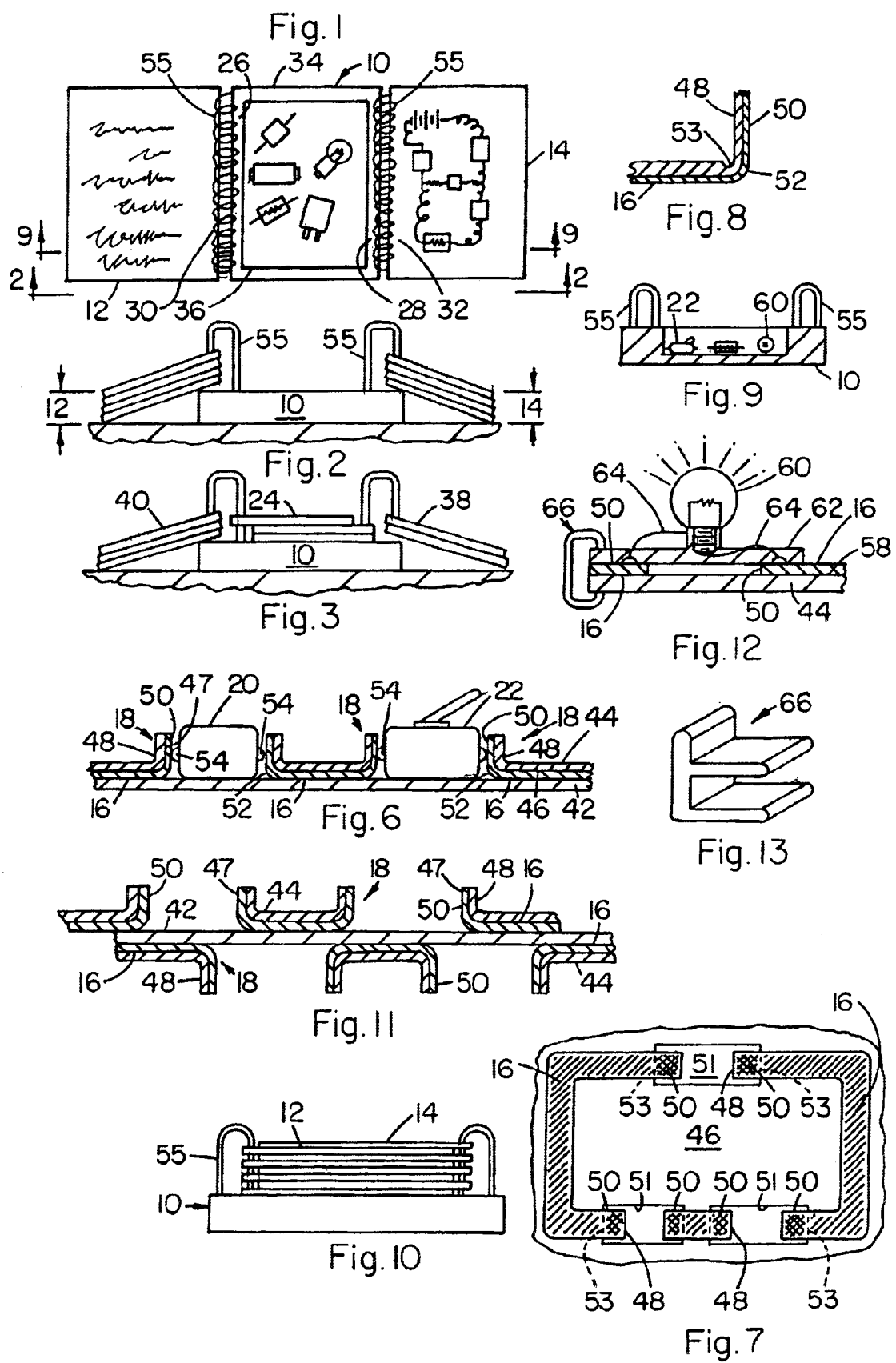

HANDS ON INSTRUCTION MANUAL

BACKGROUND OF THE INVENTION

1. Field

This invention concerns a self-contained manual for instructing in the assembly and/or operation of a wide variety of transmittable energy circuits including electrical, photoelectric, electromechanical, mechanical, hydraulic and combinations thereof. The manual further provides the equipment and components for actually assembling and retaining the circuits on the manual pages themselves.

2. Prior Art

Applicant is unaware of any manual which is adapted to provide the functions afforded by the present manual.

SUMMARY OF THE INVENTION

The present invention in its broad context comprises a manual for teaching and/or demonstrating the assembly and/or operation of a transmittable energy circuit, said manual comprising base means, a plurality of pages hinged to said base means for folding over or away from said base means, at least one of said pages having conductor portions of an aforesaid energy circuit thereon wherein said portions are provided with connector means for receiving one or more components adapted for completing said circuit, and at least one of said pages having instructions thereon for so completing said circuit.

BRIEF DESCRIPTION OF THE DRAWINGS

The invention will be further understood from the following description and drawings wherein:

FIG. 1 is an open manual view showing component storage, circuit arrangement and assembly instructions;

FIG. 2 is a view as in FIG. 1 taken along line 2—2 therein and showing a variation in hinge means;

FIG. 3 is a view as in FIG. 2 showing use of the back of an instruction page;

FIG. 6 is an enlarged cross-sectional view of the page of FIG. 5 taken along line 6—6 thereof and showing two circuit components in their operative positions in the circuit;

FIG. 7 is a view of the underside of a circuit board page similar to that of FIG. 5;

FIG. 8 is an enlarged cross-sectional view of a connector means;

FIG. 9 is a cross-sectional view of a preferred embodiment of the base means taken along line 9—9 of FIG. 1;

FIG. 10 is a view as in FIG. 2 showing the manual in a stored condition;

FIG. 11 is a view as in FIG. 6 of an alternative page structure;

FIG. 12 is a perspective of a variation in the circuit board or substrate and the connector means; and FIG. 13 is a perspective of a connector clip useful in the variation of FIG. 12.

DETAILED DESCRIPTION

Figure 4:
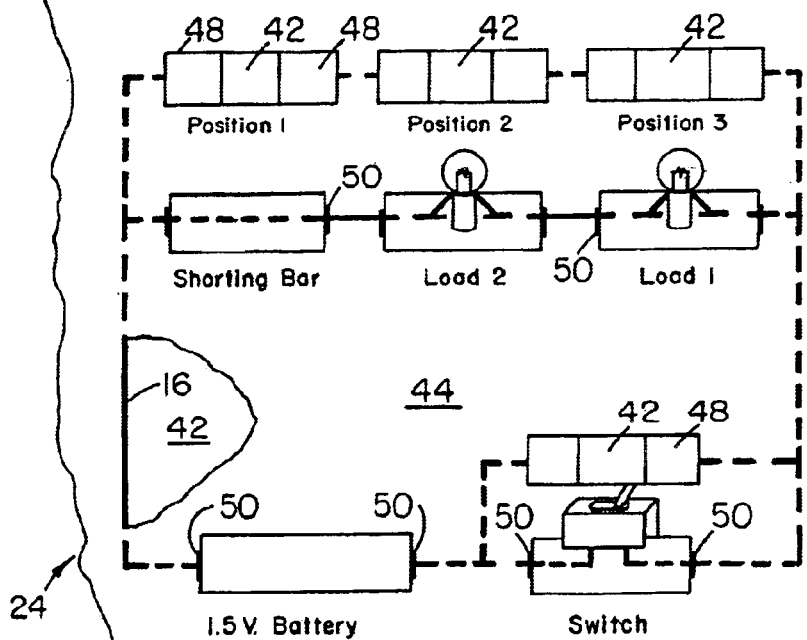
FIG. 4 is a depiction of the back of said instruction page of FIG. 3.
Figure 5:
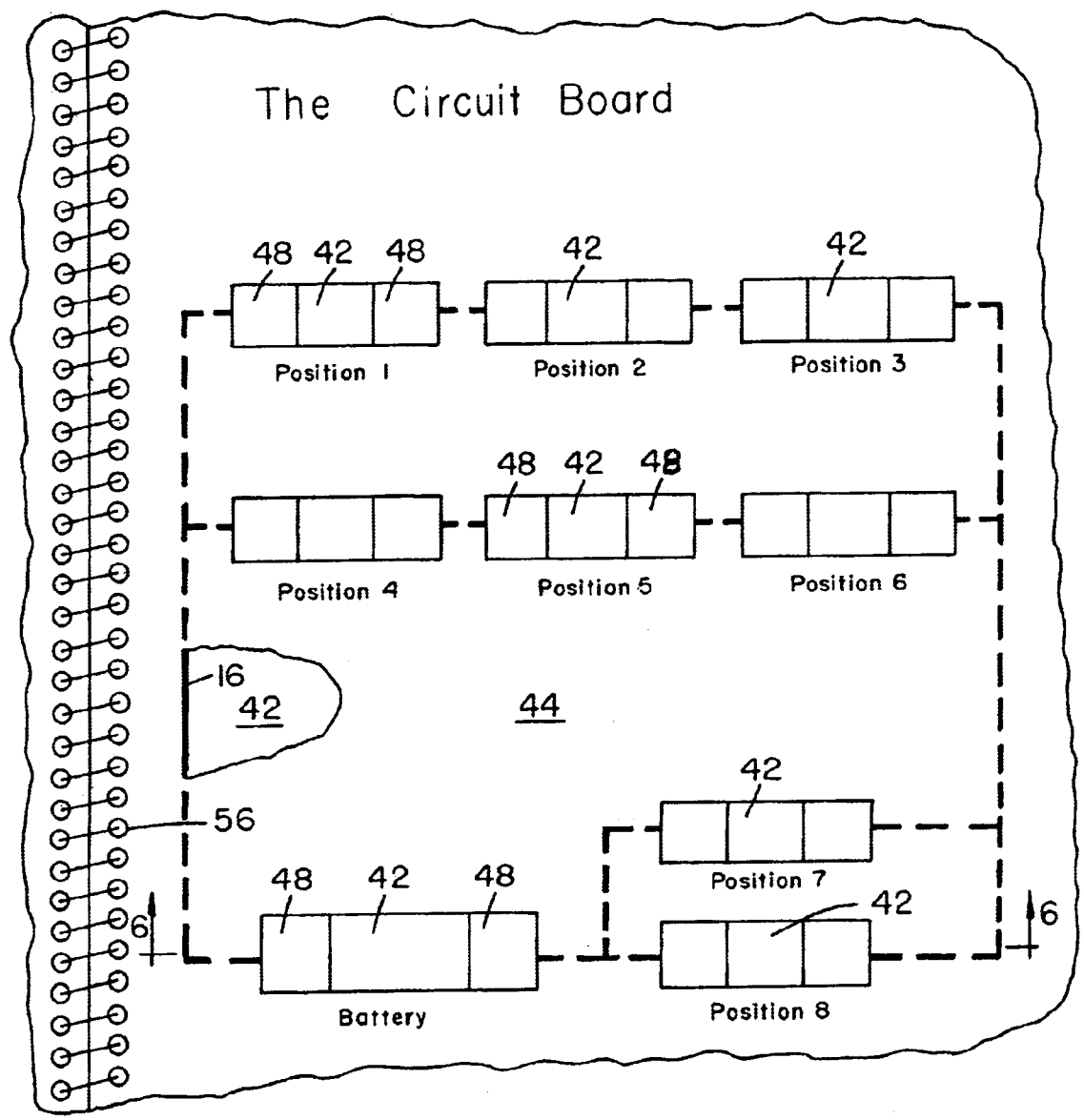
FIG. 5 is a depiction of the front top of a circuit board (substrate) page.

Referring to the drawings and with reference to the claims herein, the present manual is described in the context of making a variety of electrical circuits and comprises base means 10, a plurality of pages 12, 14 hinged to said base means for folding over or away from said base means, at least one of said pages 12 or 14 having circuit conductor portions 16 of an aforesaid energy circuit thereon, wherein said portions are provided with connector means generally designated 18 for receiving one or more components such as 20 and 22 adapted for completing said circuit, and at least one of said pages, e.g., 24 having instructions thereon for so completing said circuit.

For any of the pages in group 12 or 14, whether the group consists of a single page or multiple pages, both sides of the page can contain either or both of instructions or circuit conductor. Base means 10 is preferably substantially rectangular and having opposite base edges 26, 28 wherein group 12 pages have page edges 30 which are hinged to base edge 26, and wherein group 14 pages have page edges 32 which are hinged to base edge 28.

It is noted that other single pages or groups of pages may be hinged to other base edges such as 34 and 36 to provide for additional instructions and/or circuits, however, in the interest of minimizing the complexity and bulk of the manual, the arrangement shown in FIGS. 1–3 is most preferred. In this regard, base 10 itself may contain instruction and/or circuit conductor portions.

The content, arrangement or stacking order of the pages preferably is such that the desired circuit and the instructions regarding it are presented in full view to the student. This would require, for example, that page 38 carrying the circuit (board) and page 24 or 40 carrying the assembly instructions are laid out as shown in FIG. 3.

Referring to FIG. 6, a very satisfactory page construction, particularly for non-complex circuits, is shown. This construction comprises an electrically non-conductive backing sheet 42 or page and a non-conductive circuit board (substrate) 44 of stiff cardboard or plastic, preferably of from about 0.020 to about 0.090 in. thick wherein electrical conductor means 16 such as flat strips of aluminum or tin foil or the like are adhered to the underside 46 of the circuit board to provide an incipient electrical circuit of any desired design as shown in FIG. 7. These strips extend onto the distal sides 47 of hinged tabs 48 to provide electrical contacts 50 by bending the tabs thru cut outs 51 in a proximal direction, i.e., toward the page top side. The hinge segments 52 of these tabs can be of any design including simply the forced bends in the backing sheet material per se, or the segments may have preformed indentations 53 as shown in FIG. 8. In any event, the hinges must provide sufficient resistance to bending in order for contacts 50 to forcefully engage terminal portions such as 54 on the electrical components such as 20 and 22 as shown in FIG. 6.

Referring to FIG. 11, both sides of a page can provide connector means 18 and circuit conductor segments 16 such that the capacity for greater circuit variety can be achieved without substantial increase in page bulk. In this regard, a single page such as 38 can contain a generic type of circuit design which can utilize a large variety of electrical components and combinations thereof to produce a large variety of completed circuits. In a further embodiment, the connector means may be employed to link pages of the same manual to each other, or to link one manual to another to form more complicated circuits, or to link the manual to a computer or other external system. Such links can be made for example by cables, wires, connectors, flex circuitry or fiber optics and these manuals or pages may be either stacked or placed beside each other.

Referring to FIGS. 9 and 10, base means 10 preferably has the configuration of a rectangular tray in which the multiplicity of components to be used in completing a variety of circuits can be stored. Such components include substantially any active or passive electrical or electronic devices including switches, relays, resistors, photoelectric devices, lamp bulbs, capacitors, current induction devices, transformers, transistors, shunts, miniaturized computer devices, and integrated circuits. Also included are mechanical devices such as fastening hardware, gears, pulleys, springs or the like and the like which have electrical terminals or equivalent means adapted to connect into the circuits by way of connector means such as 18 mounted on the circuit board.

Essentially any type and configuration of connector means can be used as attached to the page of the present invention and includes tabs 48, snap fastener terminals, clip type wire connectors, binding posts, plug connectors, crimp connectors, wire socket connectors, and wire twist connections.

In selecting the connector type, consideration should be given to its dimensions so as not to bulk up the manual or to complicate the hinging of the pages on the base means. In this regard the hinge means 55 can be of any type which allows the turning of pages having greater then typical bulk and includes spiral as shown as 56 in FIG. 4 or of the common loose leaf or binder types.

The power source preferably is a battery, e.g., 9V affixed to the page or a connector may be adapted to connect to an external source such as a reducing transformer connected to house power. The conductor segments 16 may also be of any conductive material such as conductive ink, or fiber optics for light transmitting circuits.

Referring to FIGS. 12 and 13, the top 58 of the circuit board 44 is provided with circuit conductor segments 16 which may be of electrically conductive ink coated with insulative material except for the contact portions 50 which reside exposed on top 58. The electrical component such as lamp 60 is affixed to a carrier member 62 which is provided with suitable contact terminal means such as wiring 64 or other circuitry which makes electrical connections to contacts 50 when 62 is clamped to circuit board 44. A suitable clamp is spring clamp 66 but other clamps such as conventional binder clips can be used.

This invention has been described in detail with particular reference to preferred embodiments thereof, but it will be understood that variations and modifications will be effected within the spirit and scope of the invention.

I claim:

1. A manual for teaching and/or demonstrating the assembly and/or operation of an energy transmission circuit having at least two circuit conductor portions and a plurality of energy responsive components mechanically affixed to and between said portions and adapted for completing or interrupting said circuit, said manual comprising a base, at least one page hinged to said base for folding over or away from said base, said conductor portions being mounted on a support selected from the group consisting essentially of at least one of said pages or base, wherein each said conductor portion is provided with first segments of mechanical connector structure, wherein each said component is provided with second segments of said connector structure, said components being adapted for being hand held and moved into position thereby to engage said first and second segments to physically connect and disconnect said conductor portions to said components for completing and interrupting respectively said circuit and allowing and preventing respectively transmission of energy therethrough, and wherein said manual is provided with instructions on how to assemble and operate said circuit.

2. The manual of claim 1 where for any of said pages, both sides thereof contain either or both of instructions or circuit conductor portions.

3. The manual of claim 1 wherein said base is substantially rectangular and has opposite base edges, wherein all said pages have page edges, and wherein at least one page is hinged to each base edge.

4. The manual of claim 3 wherein said base comprises a rectangular tray in which a multiplicity of circuit components are stored.

5. The manual of claim 1 wherein said energy is selected from the group consisting essentially of electrical, or mechanical.

6. The manual of claim 1 wherein said energy is electrical and said energy responsive components are selected from the group consisting essentially of resistive, capacitive or inductive elements, or electrical switching devices.

7. A manual for teaching and/or demonstrating the assembly and/or operation of a transmittable energy circuit, said manual comprising a base structure, a plurality of pages hinged to said base structure for folding over or away from said base structure, at least one of said pages or said base structure having circuit conductor portions of an aforesaid energy circuit thereon wherein said portions are provided with connector structure for receiving one or more components adapted for completing said circuit, at least one of said pages or said base structure having instructions thereon for so completing said circuit, and wherein each said page comprises a stiff backing sheet of electrically non-conductive material, wherein a circuit board is affixed at portions of its underside to portions of at least one side of said backing sheet, wherein said conductor portions are affixed to said circuit board underside, and wherein segments of said circuit board having conductor portions affixed thereto are cut from said board to provide hinged tabs which can be lifted in a pivotal manner from the top side of said board to provide electrical contacts for making electrical connection to said components.

8. A manual for teaching and/or demonstrating the assembly and/or operation of a transmittable energy circuit, said manual comprising a base, a plurality of pages hinged to said base for folding over or away from said base, at least one of said pages or said base having circuit conductor portions of an aforesaid energy circuit thereon wherein said portions are provided with connector structure for receiving one or more circuit components adapted for completing said circuit, at least one of said pages or said base having instructions thereon for so completing said circuit, and wherein each said page comprises a stiff, thin circuit board page having circuit conductor segments on at least one of its flat side surfaces, wherein portions of said segments are coated with electrically insulative material and wherein other portions of said segments provide exposed electrical contacts, and wherein said circuit components are provided with contact terminal structure adapted to complete an electrical circuit when brought into contact with said electrical contacts.

* * * * *